United States Patent [19]

Frei

[11] 4,262,515
[45] Apr. 21, 1981

[54] METHOD AND APPARATUS FOR BENDING A TUBE

[75] Inventor: Arno Frei, Seuzach, Switzerland

[73] Assignee: Sulzer Brothers Limited, Winterthur, Switzerland

[21] Appl. No.: 969,478

[22] Filed: Dec. 14, 1978

[30] Foreign Application Priority Data

Dec. 21, 1977 [CH] Switzerland ................. 15868/77

[51] Int. Cl.³ .................... B21D 11/06; B21D 3/00
[52] U.S. Cl. ............................ 72/302; 29/227; 254/10.5
[58] Field of Search ........... 72/295, 298, 302, 311, 72/392; 29/227; 140/89; 254/10.5

[56] References Cited

U.S. PATENT DOCUMENTS

| | | | |
|---|---|---|---|
| 716,683 | 12/1902 | Daniels et al. | 140/89 X |
| 1,817,877 | 8/1931 | Cawley | 140/89 |
| 3,747,895 | 7/1973 | Martin | 29/227 |
| 3,946,987 | 3/1976 | Shultz | 254/10.5 |

*Primary Examiner*—Milton S. Mehr
*Attorney, Agent, or Firm*—Kenyon & Kenyon

[57] ABSTRACT

A tube coil of austenitic or ferritic material is bent into a coil with a steep pitch by clamping the end of the tube section to be bent in clamps located at the ends of two radial arms of the bending apparatus. One arm is then pulled away from the other arm to cause the clamped ends to displace relative to each other while a steeper pitch is imparted. The pulled arm is free to rotate while the clamps are free to pivot in planes tangential to the tube coils. In one embodiment, the clamps can also move radially of the supporting arm.

10 Claims, 3 Drawing Figures

METHOD AND APPARATUS FOR BENDING A TUBE

This invention relates to a method for bending a tube. More particularly, this invention relates to a method for bending a tube into a coil with steep helices.

While the bending of tubes to flat helices using a system of rollers is quite straightforward, the production of steep helices gives rise to considerable difficulties. This is because the tube for bending tends, sporadically, to rotate about itself in the roller system. Therefore, in the production of tube coils with a steep pitch, the attempt was hitherto made to approach the helical form by three-dimensional polygonal bending of the tubes. However, when assembled into a bunch, polygonal tube coils of this type have the disadvantage that the radial distances from the coil axis vary. This gives rise to various structural problems leading to complicated and expensive solutions.

Accordingly, it is an object of the invention to provide a method for the accurate bending of tubes into coils with steep helices.

It is another object of the invention to obtain tube coils with accurately bent steep helices.

It is another object of the invention to provide a relatively simple method for bending tube coils into helical shapes with steep helices.

Briefly, the invention provides a method for bending tubes.

The method includes the steps of winding a tube into a circle or into a winding of small pitch in a first operation and of thereafter pulling the tube apart to form a coil having a steep pitch or helix in a second operation.

Prior to the pulling apart of the tube, the tube is engaged at each end of the section to be pulled apart in order to prevent rotation of the tube about the axis of the tube while permitting the ends to move in space and pivot during the pulling apart of the tube. The step of pulling is such as to effect an imposition of forces in the direction of the axis of the tube coil to cause a relative displacement of the tube ends.

Coils with tubes having steep helices can be produced very accurately by this method easily and economically. There are practically no rejects with the method and the tube material is subjected only to minor stress. The preferred application of the tube coils made by the method is as the connecting tubes between two heat exchangers, whose tubes are themselves constructed as weak-pitch coils.

One apparatus employing the method comprises a guide having a longitudinally disposed axis and a pair of arms which are mounted radially of the guide axis with at least one arm being rotatable about the axis and movable coaxially of the guide. In addition, a clamp is mounted on each respective arm for clamping an end of a tube coil therein and for pivoting in a plane tangential to the tube coil. The distance between the axis of the clamped tube coil ends and the guide axis correspond substantially to the radius of a turn of the tube coil. At least one of the arms has a means for connection of a traction means for applying a pulling force on the arm parallel to the axis of the tube coil in order to pull the clamped tube coil apart to form a coil having a steep pitch or helix.

These and other objects and advantages of the invention will become more apparent from the following detailed description and appended claims taken in conjunction with the accompanying drawings in which:

FIG. 3 illustrates a part of a third embodiment of an apparatus employed in a method according to the invention.

Figure 1:
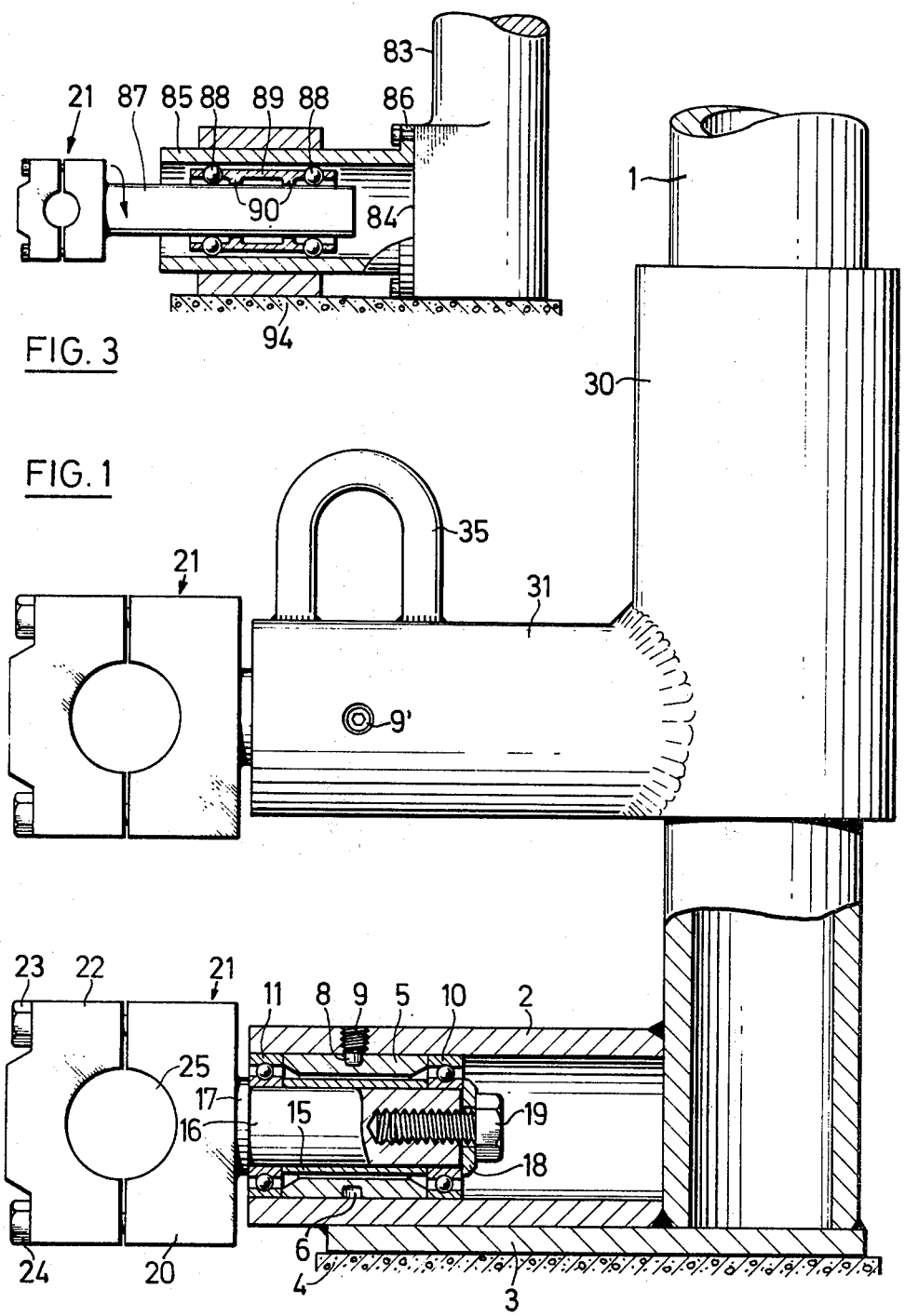
FIG. 1 illustrates a partial sectional and partial elevational view of an apparatus employed in a method according to the invention.

Referring to FIG. 1, the apparatus for bending a tube and, more specifically a coil of tubing, comprises a longitudinal guide in the form of a cylindrical vertical tube 1 having a longitudinally disposed axis, and a pair of arms 2, 31 which extend radially from the tube 1. As shown, the lower arm 2 is hollow and is welded to the tube 1 while both the tube 1 and arm 2 are welded to a base plate 3 disposed at right angles to the axis of tube 1. The baseplate 3 is fixed to a foundation 4 on either side of the arm 2 by means of bolts (not shown).

The arm 2 is bored cylindrically and contains a sleeve 5 with a circular groove 6 in which a stud 8 of a grub screw 9 threaded into the arm 2 engages. The sleeve 5 is thus secured in the arm 2 axially thereof. Outer race rings of two ball bearings 10, 11 are disposed in the arm 2, one at each end of the sleeve 5. Associated inner race rings of the bearings 10, 11 are axially spaced by a bush 15 and are mounted on a journal 16 of a clamp 21 which projects into the arm 2. The journal 16 has a collar 17 which abuts the inner race of one bearing 11 while a washer 18 abuts the inner race of the other bearing 10 under the clamping action of a screw 19 threaded into the end of the journal 16.

The clamp 21 has a saddle 20 which is integral with the journal 16 and a cover 22 which is secured to the saddle 20 via screws 23, 24. As indicated, the cover 22 of the clamp 21 can be tightened by the two screws 23 and 24 threaded in the saddle 20 and extending through the cover 22. A bore 25 for a tube or pipe for clamping is provided in the region of the dividing line between the saddle 20 and the cover 22. The clamp 21 is thus pivotable about the axis of the hollow arm 2 which thus defines a pivot axis for the clamp 21 radially and perpendicularly of the axis of the tube 1 but is secured against any displacement in the direction of this pivot axis.

The upper arm 31 is likewise hollow and is welded to a tube 30 which is slidably mounted on the guide tube 1. In this manner, the arm 31 is able to rotate about the guide tube axis and to move coaxially of the guide tube 1.

The upper arm 31 also carries a clamp 21' of the same construction as the clamp 21 mounted on the lower arm 2 and restrained against displacement in the direction of the axis thereof by means of a screw 9'. A means such as a shackle 35 is welded to the top of the arm 31 for connection to a traction means (not shown) which can be hooked therein for applying a pulling force on the arm 31 parallel to the guide tube axis in order to pull the arm 31 away from the lower arm 2. Alternatively, the apparatus may be so disposed that the axis of the longitudinal guide tube 1 is horizontal.

The apparatus shown in FIG. 1 is preferably used for stretching tube coils made from a material having a relatively low shear modulus, e.g. austenitic material. In a first operation, the tube is coiled with a small pitch to the required diameter in a roller system (not shown) of known construction. Thereafter, in a second operation, the tube is clamped at two preselected spaced positions, i.e. the ends of the section of the coiled tube requiring stretching, in the clamps 21 and 21' so that the axis of the existing coil coincides with the axis of the longitudinal guide tube 1. Traction is then applied by a traction means (not shown) to the shackle 35 parallel to the axis of the tube 1, and, thus, to a central axis of the coiled tube, the sliding tube 30 being allowed to rotate about the tube 1. In this operation, the coil of originally small pitch is pulled out uniformly to a steep pitch (or helix), the coil angle being reduced, without the diameter of the tube cylinder varying appreciably. During the pulling-out movement, the clamps 21, 21' pivot about the associated axis of the arms 2, 31 to allow a relative displacement of the clamped (i.e. engaged) ends of the coiled tube and stretching of the coiled tube into a coil having a steep pitch.

It has been found the ferritic material, which has a higher shear modulus than austenitic material, cannot be stretched uniformly in the apparatus shown in FIG. 1, because tube coils of ferritic material tend to contract to a smaller turn diameter when they are stretched.

Figure 2:
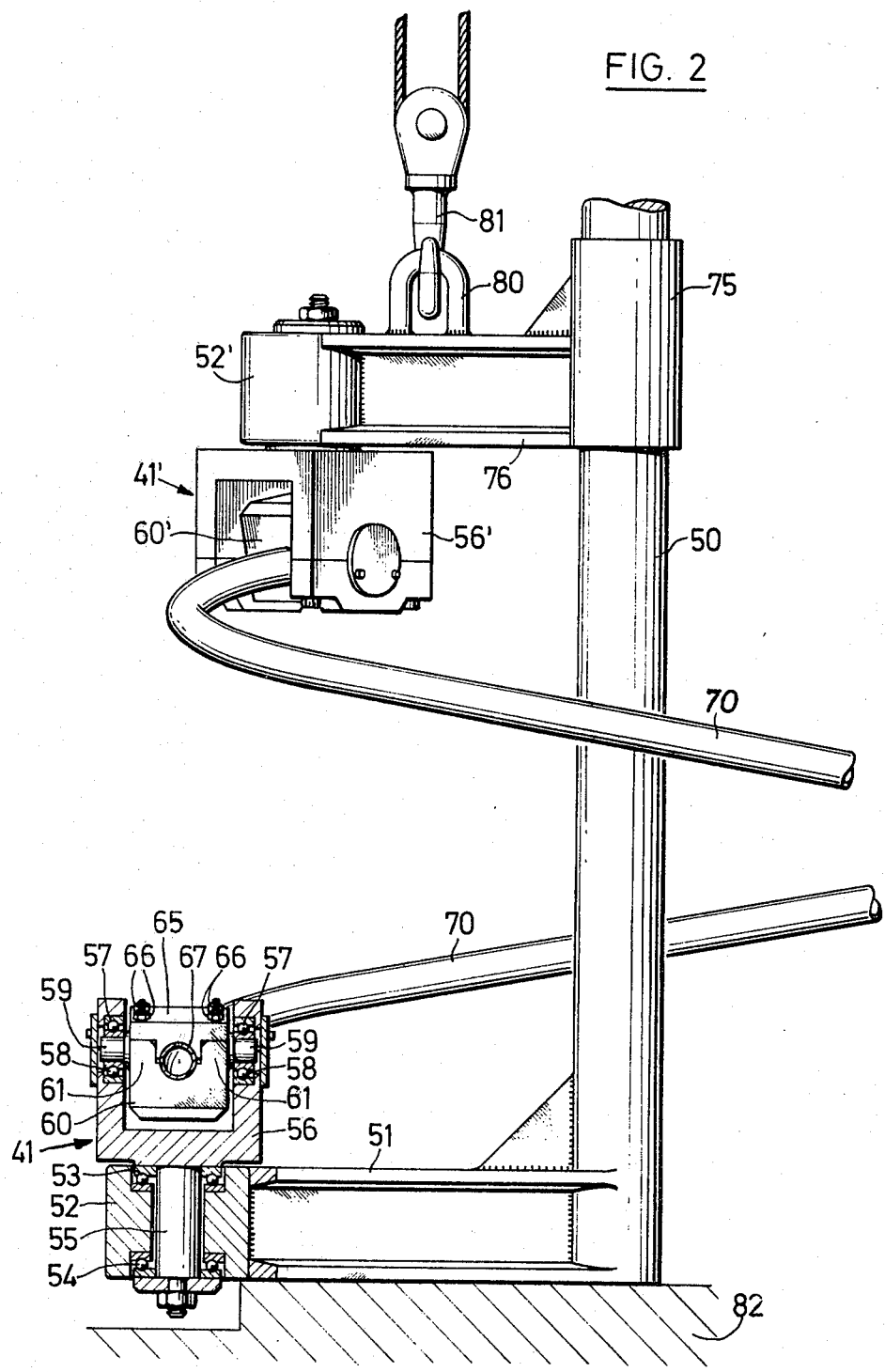
FIG. 2 illustrates a view of a second embodiment of an apparatus employed in a method according to the invention during operation.

Referring to FIG. 2, an apparatus suitable for stretching tube coils made from a material having a relatively high shear modulus comprises a central longitudinal guide member 50, an I-cross-section arm 51 disposed at right angles and welded to the bottom end of the guide member and a similar arm 76 mounted for rotation and sliding on the guide member 50 via a sliding tube 75.

The arm 51 has a cylindrical bearing member 52 at the outer end in which a yoke is rotatably mounted for rotation on an axis parallel to the guide member axis. To this end, the yoke has a pivot 55 mounted parallel to the vertical axis of the longitudinal guide member 50 on two axial ball bearings 53, 54 in the bearing member 52. The pivot 55 carries a U-shaped body 56 with two divided bearing points 57. The outer race ring of a ball bearing 58 rests in each bearing point 57.

A clamp 41 which includes a pair of clamping elements 60, 65 is mounted in the body 56 of the yoke to pivot on an axis perpendicular and radial to the guide member 50. As shown, one clamping element 60 is in the form of a crank with two cheeks 61 from which two journals 59 project into and are journalled in the inner race rings of the bearings 58. The other clamping element 65 is in the form of a cover which is secured by means of four screws 66 (only two visible in FIG. 2) to the two cheeks 61 of the crank 60. The two cheeks 61 and the cover 65 define a cylindrical recess 67 therebetween in which the bottom end of a tube coil 70 is clamped.

The I-cross-section arm 76 is welded to the sliding tube 75 and has a bearing member 52', in which there is mounted an identical rotatable clamp 41' to the one in the bearing member 52, except that clamp 41' extends downwardly. The top end of the tube coil 70 is clamped therein. The top of the arm 76 has a shackle 80 in which the hook 81 of a traction means, for example a crane, engages.

The guide member 50 and lower arm 51 are fixed to a foundation 82, for example by bolts (not shown).

In order to obtain a coil with steep helices, the ferritic tube is coiled with a turn diameter larger than that required in the finished tube coil, but with a small pitch, in a conventional manner, e.g. in a roller system. Thereafter, in a second operation, this coil 70 is clamped in the clamps 41, 41' of the apparatus shown in FIG. 2 and finally stretched by the arm 76 being raised by means of the crane hook 81. During this pulling apart of the coil, the cranks 60, 60' tip or pivot in the yokes about the crank pivots 59. At the same time, since the diameter of the coil 70 also decreases, due to the stretching of the ferritic material, the U-shaped bodies 56, 56' are pivoted slightly about the axis of the associated pivots 55.

When very steep tube coils are made from a material having a high shear modulus, it may be advantageous to perform the pulling-out operation in a number of stages, the apparatus used in each case having a decreasing arm length. It may also be advantageous to use an apparatus in which the bearing members 52, 52' can slide in the arms 51, 76 towards the axis of the guide member 50 during the stretching operation. The bottom arm of a facility of this kind is constructed substantially as shown in FIG. 3, in which a flat fixing surface 84 is forged on a longitudinal guide member 83. A hollow arm 85 is screwed to this surface 84 by means of an integral end flange 86. The arm 85 is hardened and internally ground and contains a hardened and ground sliding journal 87 of a clamp 21 (as described above) which is guided on balls 88 within the arm 85. A bronze bush 89 slides by two inner ribs 90 on the journal 87 and has two circular rows of bores to receive the balls 88. The arm 85 is again fixed on a foundation 94 in a suitable manner (not shown). The top slidable arm of this apparatus is similarly provided with a corresponding sliding clamp which also carries an identical journal.

An apparatus with arms of the kind shown in FIG. 3 is suitable for stretching austenitic and ferritic tube coils. In the case of the latter, the arms automatically decrease in length during the stretching operation.

Instead of reducing friction to a minimum by ball bearings, it may be advantageous to control the rotary and sliding movements of the tubes 30, 75 about the longitudinal guides 1, 50 respectively, and the movements of the journals 16, 59 and 87 in their bearings in the direction of rotation or longitudinal direction respectively, using the constrained axial movement of the sliding tubes 30 and 75 by transmission, cables or similar means.

It is also possible to bend tubes which have more than one 360° full turn in each above described apparatus. It is also possible to produce the steep pitch in sections of a long tube coil. The term "steep pitch" as used herein means that the pitch angle of the coil being pulled apart is in the region 15° to 75°. The diameter of the coil can be up to 10 m.

What is claimed is:

1. A method of bending a tube comprising the steps of
winding a tube into either a circle or a helix of small pitch;
clamping the tube at two preselected positions to prevent rotation of the tube about the axis of the tube; and
thereafter pulling the tube apart in a direction parallel to a central axis of said circle or helix while permitting said positions to move in space and pivot to effect an imposition of forces in the direction of said central axis to cause a relative displacement of said positions to form a permanently deformed coil having a steep pitch of from 15° to 75°.

2. A method of bending a tube into a coil with steep helices, said method comprising the steps of
winding a tube having a longitudinal axis into a coil of small pitch in a first operation;

thereafter clamping each end of the tube to prevent rotation of the tube about said axis; and then pulling the tube apart with said tube ends moving in space parallel to a central axis of said coil while pivoting about a radial axis perpendicular to said central axis to permanently deform said tube into a coil with a steep pitch.

3. A method of bending a tube into a coil with steep helices, said method comprising the steps of winding a tube having a longitudinal axis into a winding of small pitch;

thereafter engaging the tube at two preselected spaced positions of the tube to prevent rotation of said tube between said positions about said axis;

then pulling said tube apart between said positions with said tube positions moving in space parallel to a central axis of said tube winding while pivoting about a radial axis perpendicular to said central axis to permanently deform said tube into a winding with a steep pitch.

4. A method of bending a tube comprising the steps of winding a tube having a longitudinal axis into a coil of small pitch, thereafter clamping each end of the tube to prevent rotation of the tube about said axis; and pulling the ends of the tube apart to effect an imposition of forces in the direction of a central axis of the tube coil to cause a relative displacement of the tube ends circumferentially about said central axis and stretching of the tube into a coil having a steep pitch.

5. A method as set forth in claim 4 wherein the tube is made of austenitic material and said step of pulling effects a reduction in the coil angle of the tube without the diameter of the tube varying appreciably.

6. A method as set forth in claim 4 wherein the tube is made of ferritic material and said step of pulling effects a decrease in the diameter of the tube.

7. A method as set forth in claim 2 wherein said steep pitch is in the region of 15° to 75°.

8. A method as set forth in claim 3 wherein said steep pitch is in the region of 15° to 75°.

9. A method as set forth in claim 4 wherein said steep pitch is in the region of 15° to 75°.

10. A method of bending a tube of ferritic material into a coil with steep helices, said method comprising the steps of winding a tube of ferritic material having a longitudinal axis into a winding of small pitch;

thereafter clamping the tube at two preselected spaced positions of the tube to prevent rotation of said tube between said positions about said axis;

then pulling said tube apart between said positions with said tube positions moving in space parallel to a central axis of said tube winding while pivoting about an axis in a plane perpendicular to said central axis and pivoting about an axis parallel to said central axis to permanently deform said tube into a winding with a reduced diameter and a steep pitch.

* * * * *